US011898528B2

(12) United States Patent
Kusuhara et al.

(10) Patent No.: US 11,898,528 B2
(45) Date of Patent: Feb. 13, 2024

(54) IGNITION DEVICE

(71) Applicant: DIAMOND & ZEBRA ELECTRIC MFG. CO., LTD., Osaka (JP)

(72) Inventors: Tsutomu Kusuhara, Osaka (JP); Mitsuhiro Izumi, Osaka (JP); Hiroyuki Kimura, Osaka (JP)

(73) Assignee: DIAMOND & ZEBRA ELECTRIC MFG. CO., LTD., Osaka (JP)

( * ) Notice: Subject to any disclaimer, the term of this patent is extended or adjusted under 35 U.S.C. 154(b) by 0 days.

(21) Appl. No.: 18/304,871

(22) Filed: Apr. 21, 2023

(65) Prior Publication Data

US 2023/0392571 A1 Dec. 7, 2023

(30) Foreign Application Priority Data

Jun. 7, 2022 (JP) ................................. 2022-092005

(51) Int. Cl.
*F02P 3/04* (2006.01)
*F02P 3/05* (2006.01)

(52) U.S. Cl.
CPC ............. *F02P 3/0435* (2013.01); *F02P 3/051* (2013.01)

(58) Field of Classification Search
CPC ...... F02P 3/0435; F02P 3/30453; F02P 3/051; F02P 3/0807; F02N 99/004
See application file for complete search history.

(56) References Cited

U.S. PATENT DOCUMENTS 4,365,186 A * 12/1982 Gerry ........................ H04N 3/00 315/176
6,779,517 B2 * 8/2004 Sakakura ................ F02P 17/12 123/655
6,954,074 B2 * 10/2005 Zhu ......................... F02P 17/12 324/399
7,347,195 B2 * 3/2008 Biljenga ................ F02P 3/051 123/620
9,874,194 B2 * 1/2018 Skowronek ............... F02P 3/04
10,138,861 B2 * 11/2018 Ishida ........................ F02P 9/00
2014/0000555 A1 * 1/2014 Glugla .................. F02P 5/1504 123/305

FOREIGN PATENT DOCUMENTS

JP 6517088 B2 5/2019

* cited by examiner

*Primary Examiner* — Grant Moubry
*Assistant Examiner* — James G Moubry
(74) *Attorney, Agent, or Firm* — Rimon P.C.; Tomoki Tanida

(57) ABSTRACT

An ignition device for an internal combustion engine that uses fuels including hydrogen. The ignition device includes an ignition coil including a primary coil and a secondary coil, a power supply device, a switching element, a spark plug, and a limiting diode. The switching element performs switching between passage and interruption of a primary current. The spark plug causes discharge at a gap, based on a high voltage induced at the secondary coil. The limiting diode includes a Zener diode that is forward-biased when oriented in a direction from the one end to the other end of the secondary coil. A breakdown voltage of the limiting diode is higher than the maximum value of an ON-state voltage obtained by multiplication of a value of a direct-current voltage applied to the primary coil by a ratio of the number of turns of the secondary coil to that of the primary coil.

8 Claims, 6 Drawing Sheets

IGNITION DEVICE

RELATED APPLICATIONS

This application claims the benefit of Japanese Application No. 2022-092005, filed on Jun. 7, 2022, the disclosure of which is incorporated by reference herein.

BACKGROUND OF THE INVENTION

Field of the Invention

The present invention relates to an ignition device for use in an internal combustion engine.

Description of the Background Art

Conventionally, an ignition device is mounted in an internal combustion engine including a spark-ignition (SI) reciprocating engine used in an automobile or the like. Under control of an engine control unit (ECU), an ignition coil of the ignition device steps up a low direct-current voltage supplied from a battery to several thousands of volts to several tens of thousands of volts, and provides the stepped-up voltage to a spark plug, to generate electric spark and ignite a fuel. An example of such a conventional ignition device is described in Japanese Patent No. 6517088, for example.

Japanese Patent No. 6517088 discloses an ignition device (1) for use in an internal combustion engine having the following configuration. First, a primary coil (21) of an ignition coil (2) is connected to a direct-current power supply (VB+) such as an on-vehicle battery. Then, ON/OFF of a main switching element (4) is controlled so that switching between passage and interruption of a primary current (I1) flowing through the primary coil (21) is performed (paragraph [0015] and FIG. 1). Further, one end of a secondary coil (22) that is magnetically coupled to the primary coil (21) via an iron core is connected to a spark plug (3), and the other end is connected to a direct-current power supply line via an ON-voltage preventing diode (23). As a result, when the primary current (I1) is interrupted in the ignition coil (2), a high voltage is generated on a secondary side. This causes electrical breakdown to occur at a discharge gap of the spark plug (3), and causes a secondary current (I2) to flow in a forward direction of the ON-voltage preventing diode (23) (paragraphs [0016] and [0029]). Meanwhile, when the primary coil (21) starts being energized, an ON voltage of opposite polarity generated in the secondary coil (22) is suppressed by the ON-voltage preventing diode (23) (paragraph [0017]).

In recent years, a fuel including hydrogen is used in a spark-ignition (SI) reciprocating engine in many cases. It is considered that use of a fuel including hydrogen contributes to realization of a so-called low carbon society. On the other hand, however, hydrogen has properties of high combustibility at relatively low temperatures and of a high combustion rate. For this reason, for example, when a slight degree of discharge occurs in a spark plug at an unexpected timing, a fuel can possibly be ignited to burn. In this case, there is a fear of causing backfire in which flames move backward toward an intake device from a combustion chamber of an engine, after fire in which a fuel remaining in an exhaust gas of an engine burns in an exhaust stream path or the like, or abnormal combustion such as pre-ignition in which an ignition timing is out of control.

SUMMARY OF THE INVENTION

It is an object of the present invention to provide a technique that can prevent discharge from occurring in a spark plug at an unexpected timing.

To solve the above-described problem, according to the first invention of the present application, an ignition device for use in an internal combustion engine that uses a fuel including at least hydrogen, includes an ignition coil, a power supply device, a switching element, a spark plug, and a limiting diode. The ignition coil is formed by electromagnetic coupling of a primary coil and a secondary coil. The power supply device applies a direct-current voltage to one end of the primary coil via a power supply line. The switching element is interposed between the other end of the primary coil and a ground point, and is capable of performing switching between passage and interruption of a primary current flowing through the primary coil from the power supply device. The spark plug ignites the fuel by occurrence of discharge at a gap, based on a high voltage induced at one end of the secondary coil. The limiting diode includes a Zener diode or an avalanche diode that is interposed in a first connecting wire or a second connecting wire and is forward-biased when the diode is oriented in a direction from the one end of the secondary coil to the other end of the secondary coil. The first connecting wire is a conductor connecting directly or indirectly the other end of the secondary coil and the power supply device or the ground point. Further, the second connecting wire is a conductor connecting the one end of the secondary coil and the spark plug. A breakdown voltage of the limiting diode is higher than the maximum value of an ON-state voltage. The ON-state voltage is a voltage value that is calculated by multiplication of a voltage value of the direct-current voltage applied to the one end of the primary coil by the power supply device, by a ratio of the number of turns of the secondary coil to the number of turns of the primary coil.

The first invention of the present application can reduce the ON-state voltage generated in the secondary coil when a primary current flows through the primary coil (ON state). Thus, discharge can be prevented from occurring in the spark plug in an ON state. Further, after the discharge, a current flows through the limiting diode in a reverse direction, so that residual energy remaining near the spark plug can be reduced. Consequently, discharge can be further prevented from occurring in the spark plug at an abnormal timing afterwards.

DESCRIPTION OF THE PREFERRED EMBODIMENTS

Below, an illustrative preferred embodiment of the present invention will be described with reference to the drawings.

1. First Preferred Embodiment

1-1. Configuration of Ignition Device

Figure 1:
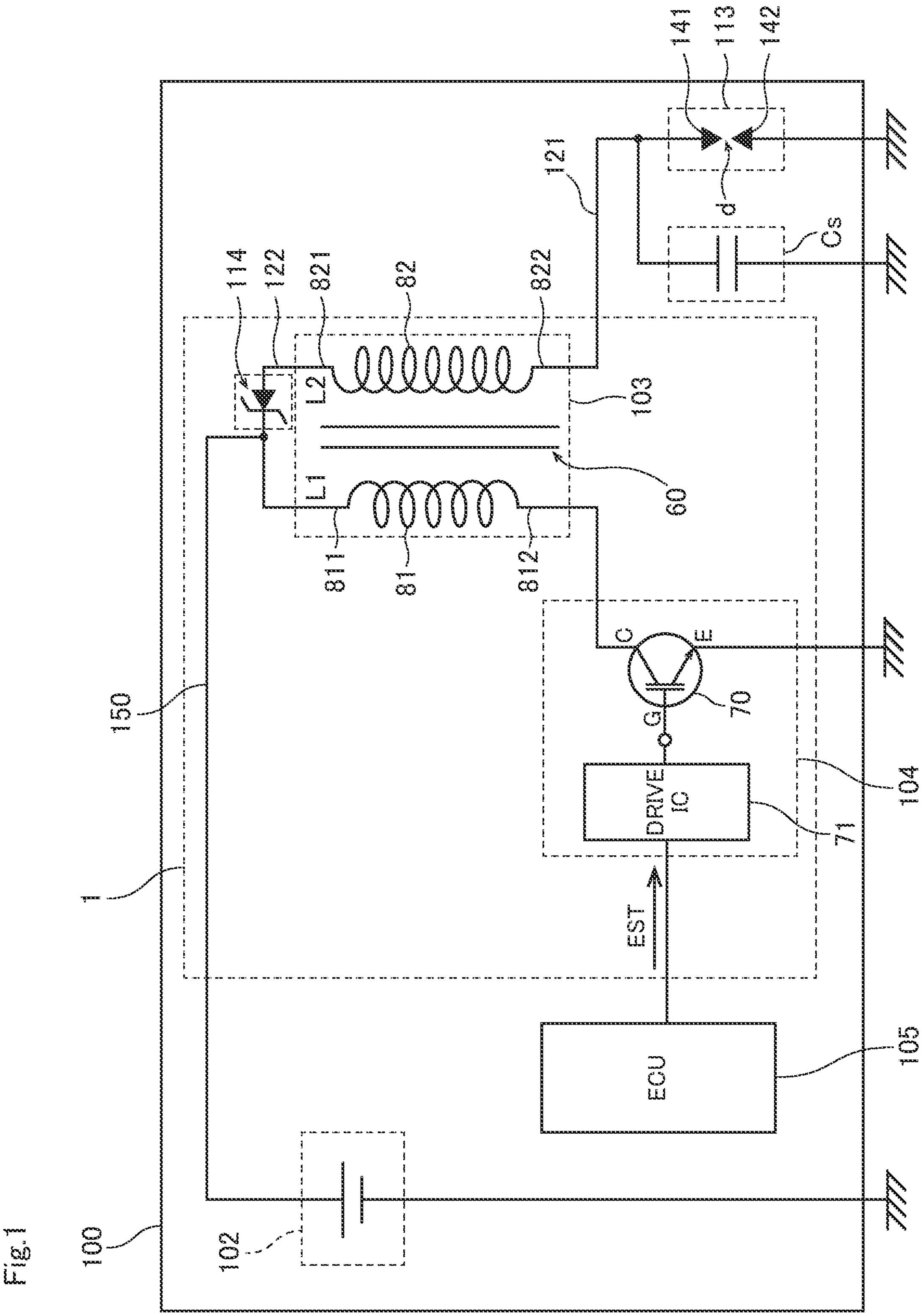
FIG. 1 is a block diagram schematically showing an operating environment of an ignition device for use in an internal combustion engine according to a first preferred embodiment.

First, a configuration of an ignition device 1 for use in an internal combustion engine corresponding to a first preferred embodiment of the present invention will be described with reference to the drawings. FIG. 1 is a block diagram schematically showing an operating environment of the ignition device 1 according to the first preferred embodiment. Note that a primary coil L1 and a secondary coil L2 of an ignition coil 103 included in the ignition device 1 are arranged in a direction in which the coils are stacked on each other as described later, but they are shown as being arranged adjacent to each other in FIG. 1 for the purpose of easy understanding.

The ignition device 1 according to the present embodiment is, for example, a device that is mounted in an internal combustion engine such as a spark-ignition (SI) reciprocating engine used in a vehicle body 100 of an automobile or the like and applies a high voltage for causing spark discharge to occur in a spark plug 113. Further, as shown in FIG. 1, the vehicle body 100 includes the spark plug 113, a power supply device 102 (battery), and an engine control unit (ECU) 105, in addition to the ignition device 1. Note that, in a broad sense, the spark plug 113, the power supply device 102, and the ECU 105 can be regarded as being included in the ignition device 1.

The spark plug 113 is a device for performing an ignition operation in a combustion chamber of an internal combustion engine. The spark plug 113 is electrically connected to one end 822 of the secondary coil L2 of the ignition coil 103 described later via a conductor. Hereinafter, the conductor connecting the spark plug 113 and the one end 822 of the secondary coil L2 will be referred to as a "second connecting wire 121". The spark plug 113 is interposed between the one end 822 of the secondary coil L2 and a ground point (ground). When a high voltage is induced in the secondary coil L2 of the ignition coil 103, and the high voltage exceeds an electrical breakdown voltage at a gap d (refer to FIG. 1) between a center electrode 141 and a ground electrode 142 of the spark plug 113, then discharge occurs at the gap d, so that spark is generated. As a result, a fuel supplied to the internal combustion engine is ignited. In other words, the spark plug 113 ignites a fuel by occurrence of discharge at the gap d, based on a high voltage induced at the one end 822 of the secondary coil L2.

In the present embodiment, hydrogen or a mixture of hydrogen and other materials is used as a fuel. That is, a fuel including at least hydrogen is used in the ignition device 1 for use in an internal combustion engine.

Further, in the second connecting wire 121 or the spark plug 113, an electrostatic capacitance component of about 15 to 20 pico-farads is present. In other words, an electrostatic capacitance component is formed between the one end 822 of the secondary coil L2 and the spark plug 113. Hereinafter, the electrostatic capacitance component will be referred to as a "floating capacitor Cs" that is virtually defined. As shown in FIG. 1, the floating capacitor Cs can be schematically expressed in parallel with the spark plug 113 in the block diagram.

The power supply device 102 is a device capable of performing charge and discharge with direct-current power. Specifically, the power supply device 102 is a storage battery. In the present embodiment, the power supply device 102 is electrically connected to the primary coil L1 of the ignition coil 103 described later via a conductor. Hereinafter, the conductor extending from the power supply device 102 will be referred to as a "power supply line 150". The power supply device 102 applies a direct-current voltage to one end 811 of the primary coil L1 of the ignition coil 103 via the power supply line 150.

The ECU 105 is an existing computer that comprehensively controls operations and the like of a transmission and an air bag in the vehicle body 100.

The ignition device 1 includes the ignition coil 103, an igniter 104, and a limiting diode 114.

Figure 2:
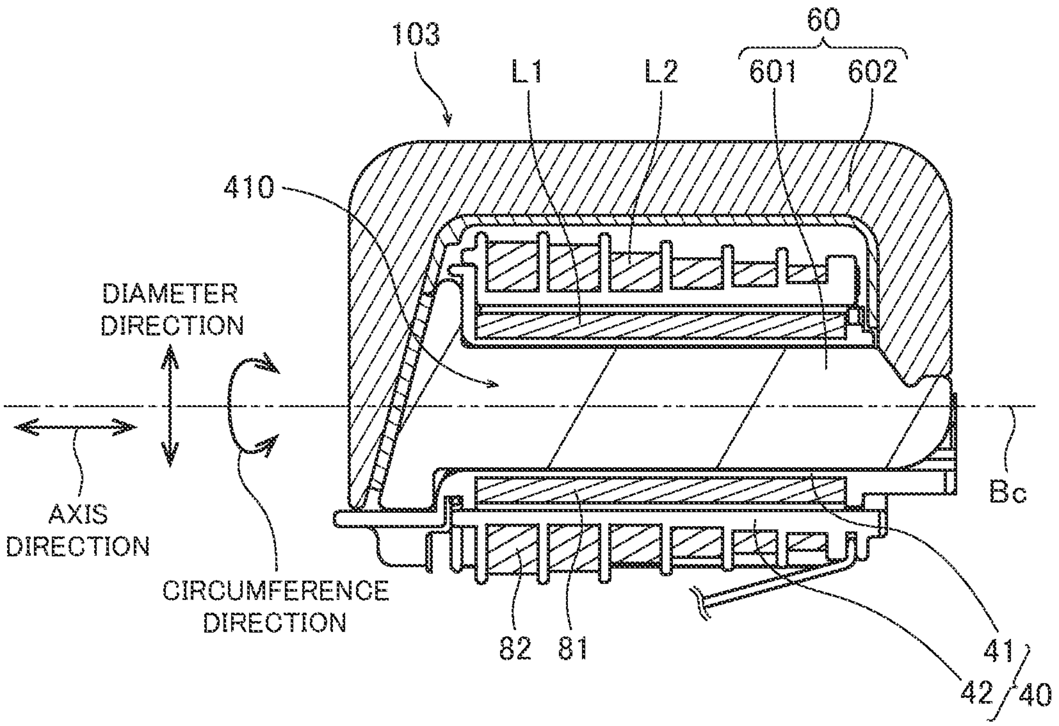
FIG. 2 is a longitudinal sectional view of an ignition coil according to the first preferred embodiment.

FIG. 2 is a longitudinal sectional view of the ignition coil 103. As shown in FIG. 2, the ignition coil 103 includes a bobbin 40, the primary coil L1, the secondary coil L2, and an iron core 60. Note that parts of the primary coil L1 and the secondary coil L2 are shown in a simplified manner in FIG. 2. Further, in the following description about the ignition coil 103, a direction parallel with a center axis Bc of the bobbin 40, a direction perpendicular to the center axis Bc of the bobbin 40, and a direction along an arc having its center on the center axis Bc of the bobbin 40 will be referred to as an "axis direction", a "diameter direction", and a "circumference direction", respectively. Further, the "direction parallel with something" includes a direction substantially parallel with something, and the "direction perpendicular to something" includes a direction substantially perpendicular to something.

The bobbin 40 includes a primary bobbin 41 and a secondary bobbin 42 that can be coupled to each other. Each of the primary bobbin 41 and the secondary bobbin 42 extends in a tubular shape along the center axis Bc. Further, the secondary bobbin 42 is placed on the diameter-direction outer side of the primary bobbin 41. For a material of the primary bobbin 41 and the secondary bobbin 42, resin is used, for example.

The primary coil L1 is formed by winding of a conductor around an outer surface of the primary bobbin 41 in the circumference direction having its center on the center axis Bc. Hereinafter, the conductor will be referred to as a "primary conductor 81". After the primary coil L1 is formed, the secondary bobbin 42 is placed so as to cover the outer surface of the primary coil L1, and is coupled to the primary bobbin 41. Then, a conductor different from the primary conductor 81 is wound around the outer surface of the secondary bobbin 42 in the circumference direction having its center on the center axis Bc, to thereby form the secondary coil L2. Hereinafter, the different conductor will be referred to as a "second conductor 82". By arranging the primary coil L1 and the secondary coil such that the coils are stacked on each other in the above-described manner, it is possible to miniaturize the whole of the ignition coil 103 including those coils. However, arrangement of the primary coil L1 and the secondary coil L2 is not limited to the above-described case in which the conductors are wound while the coils are stacked on each other. Alternatively, the primary coil L1 and the secondary coil L2 may be arranged adjacent to each other as shown in FIG. 1.

The iron core 60 has a structure in which a central iron core 601 and an outer iron core 602 are combined. Each of the central iron core 601 and the outer iron core 602 of the iron core 60 is formed of a laminated steel sheet in which silicon steel sheets are sticked together, for example. The central iron core 601 extends along the center axis Bc of the bobbin 40. Further, the central iron core 601 is inserted through a space 410 on the diameter-direction inner side of the primary bobbin 41. The outer iron core 602 extends on the diameter-direction outer side with respect to the secondary bobbin 42 and the secondary conductor 82, and connects both of the axis-direction ends of the central iron core 601. Thus, the iron core 60 forms a closed magnetic circuit structure that electromagnetically couples the primary coil L1 and the secondary coil L2. In other words, the ignition coil 103 is formed by electromagnetic coupling of the primary coil L1 and the secondary coil L2.

As shown in FIG. 1, the one end 811 of the primary coil L1 is connected to the power supply line 150 that is the conductor extending from the above-described power supply device 102. The other end 812 of the primary coil L1 is connected to the igniter 104 described later. Under control of the igniter 104, a low direct-current voltage supplied from the power supply device 102 is applied to the one end 811 of the primary coil L1, and a primary current that gradually increases starts flowing through the primary coil L1.

The one end 822 of the secondary coil L2 is connected to the spark plug 113. The secondary conductor 82 has a wire size smaller than the wire size of the primary conductor 81. Further, the number of turns (8000, for example) of the secondary conductor 82 in the secondary coil L2 is about 80 times or more the number of turns (100, for example) of the primary conductor 81 in the primary coil L1. Thus, the ignition coil 103 steps up power of a low direct-current voltage supplied from the power supply device 102 to several thousands of volts to several tens of thousands of volts during interruption of a primary current, details of which will be given later. That is, a high voltage is induced in the secondary coil L2. Then, the secondary coil L2 supplies power of the induced high voltage to the spark plug 113. Consequently, electric spark is generated in the spark plug 113, and a fuel is ignited.

Meanwhile, as shown in FIG. 1, in the secondary coil L2, the other end 821 opposite to the one end 822 connected to the spark plug 113 is electrically connected directly or indirectly to the power supply device 102 via a conductor. Hereinafter, the conductor connecting the other end 821 of the secondary coil L2 and the power supply device 102 will be referred to as a "first connecting wire 122". In the present embodiment, the other end 821 of the secondary coil L2 is electrically connected to the power supply line 150. Further, in the present embodiment, the limiting diode 114 is interposed in the first connecting wire 122. The limiting diode 114 is connected in series to the secondary coil L2. Moreover, the limiting diode 114 is forward-biased when it is oriented in a direction from the one end 822 to the other end 821 of the secondary coil L2. For the limiting diode 114 of the present embodiment, a Zener diode is used. However, an avalanche diode may be used for the limiting diode 114.

When a switching element 70 of the igniter 104 is placed in a closed state and a primary current flows through the primary coil L1 to charge the primary coil L1 (ON state), a potential difference is caused between both ends 821 and 822 of the secondary coil L2, details of which will be given later. In the present embodiment, in an ON state, the one end 822 of the secondary coil L2 is at a voltage level higher than the other end 821. Hereinafter, a potential difference between the one end 822 and the other end 821 of the secondary coil L2 will be referred to as an "ON-state voltage". The maximum value of the ON-state voltage is calculated by multiplication of a voltage value of a direct-current voltage applied to the one end 811 of the primary coil L1 by the power supply device 102 via the power supply line 150, by a ratio of the number of turns of the secondary coil L2 to the number of turns of the primary coil L1.

For example, consider a case in which a voltage value of a direct-current voltage applied to the one end 811 of the primary coil L1 is 12 V, the number of turns of the primary coil L1 is 100, and the number of turns of the secondary coil L2 is 8000. In this case, a ratio of the number of turns of the secondary coil L2 to the number of turns of the primary coil L1 is 80, and hence the maximum value of the ON-state voltage is calculated as 12×80=960 V. Thus, the maximum value of a voltage applied to the one end 822 of the secondary coil L2 is about plus 480 V, for example, and the minimum value of a voltage applied to the other end 821 of the secondary coil L2 is about minus 480 V, for example. Further, depending on the circumstances, it can be supposed that the maximum value of a voltage applied to the one end 822 of the secondary coil L2 is about 0 V, and the minimum value of a voltage applied to the other end 821 of the secondary coil L2 is about minus 960 V. Meanwhile, at that time, a voltage applied to the power supply line 150 is 12 V.

In this regard, in the present invention, a diode having a breakdown voltage higher than the maximum value of the ON-state voltage is used as the above-described limiting diode 114. The breakdown voltage of the limiting diode 114 used in the present embodiment is 1 kV or higher. In the meantime, in the above-described example, the minimum value of a voltage applied to the other end 821 of the secondary coil L2 (on an anode side of the limiting diode 114) is about minus 480 V. Further, a voltage applied to the power supply line 150 (on a cathode side of the limiting diode 114) is plus 12 V. Thus, a current can be prevented from flowing in a reverse direction of the limiting diode 114 when a primary current flows through the primary coil L1 (ON state). In other words, a current can be prevented from flowing toward the secondary coil L2 via the first connecting wire 122. This can prevent discharge from occurring in the spark plug 113 in an ON state, that is, at an abnormal timing.

Further, in the present invention, a diode having a breakdown voltage lower than an electric breakdown voltage at the gap d of the spark plug 113 is used as the limiting diode 114. The breakdown voltage of the limiting diode 114 used in the present embodiment is 2 kV or less. The effect produced by use of the limiting diode 114 having a breakdown voltage of 2 kV or less will be described in detail later.

The igniter 104 is a semiconductor device that is connected to the primary coil L1 and controls a current flowing through the primary coil L1. Further, the igniter 104 is electrically connected to the ECU 105 and receives a signal from the ECU 105. Hereinafter, a signal received from the ECU 105 will be referred to as an "EST signal". The igniter 104 includes the switching element 70 and a drive IC 71. The igniter 104 may be integral with an electronic circuit of the ECU 105.

For the switching element 70, an insulated-gate bipolar transistor (IGBT) is used, for example. The switching element 70 is interposed between the other end 812 of the primary coil L1 and the ground point (ground). A collector (C) of the switching element 70 is connected to the other end 812 of the primary coil L1. An emitter (E) of the switching element 70 is connected to ground. A gate (G) of the switching element 70 is connected to the drive IC 71.

Thus, the switching element 70 can perform switching between passage and interruption of a primary current flowing through the primary coil L1 from the power supply device 102. When the switching element 70 is placed in a closed state, a primary current flows through the primary coil L1 from the power supply device 102. When the switching element 70 is placed in an open state, the primary current flowing through the primary coil L1 is interrupted. However, other kinds of transistors may be used for the switching element 70.

The drive IC 71 is a control unit that controls switching of the switching element 70 in accordance with an EST signal received from the ECU 105. The drive IC 71 includes a logic device connected to the switching element 70. The logic device includes a logic circuit, a processor, a complex programmable logic device (CPLD), a field-programmable gate array (FPGA), an application-specific integrated circuit (ASIC), or the like, for example. The logic device performs arithmetic processing for causing the ignition device 1 to operate, to achieve ignition in the spark plug 113.

1-2. Operations of Ignition Device

Figure 3:
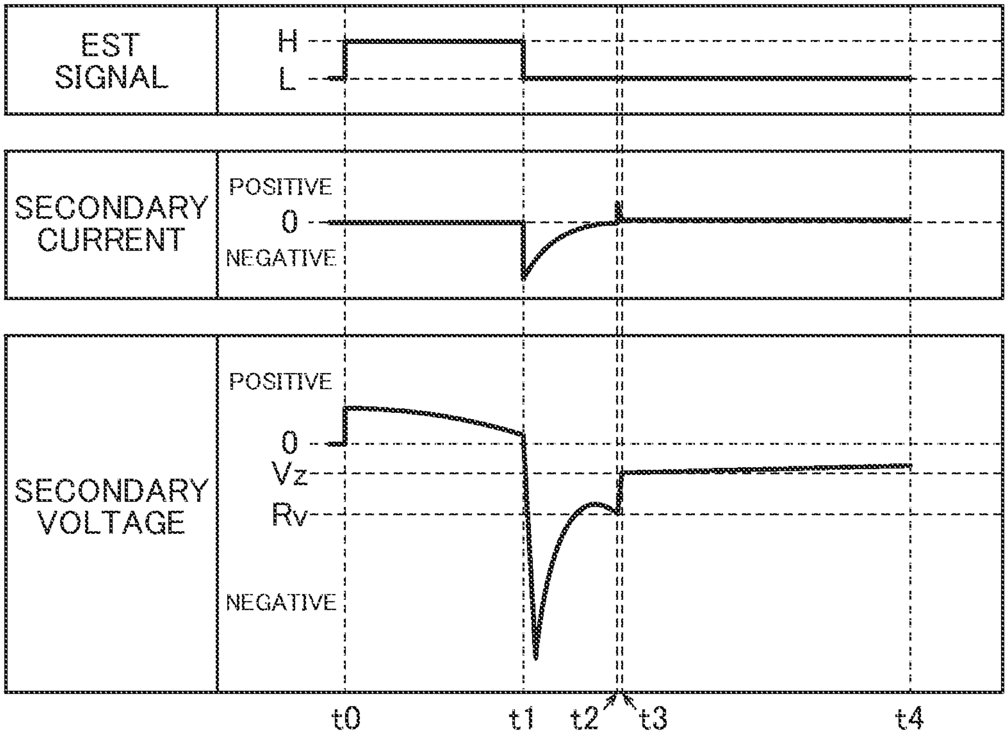
FIG. 3 shows graphs respectively representing a waveform of an EST signal, a waveform of a secondary current flowing through a secondary coil, and a voltage (secondary voltage) generated at one end of the secondary coil, in a time series, in causing the ignition device according to the first preferred embodiment to operate.

Next, operations of the ignition device 1 will be described. FIG. 3 shows graphs respectively representing a waveform of an EST signal, a waveform of a secondary current flowing through the secondary coil L2, and a voltage (secondary voltage) generated at the one end 822 of the secondary coil L2, in a time series, in causing the ignition device 1 to operate. Note that, in FIG. 3, a secondary current is shown as a negative current in a case in which it flows in a forward direction of the limiting diode 114, while being shown as a positive current in a case in which it flows in the reverse direction of the limiting diode 114. With regard to the secondary voltage in FIG. 3, a voltage value at the one end 822 of the secondary coil L2 with respect to the ground point (ground) is shown.

As described above, a direct-current voltage (12 V, for example) is applied to the one end 811 of the primary coil L1 by the power supply device 102 via the power supply line 150. Meanwhile, the other end 812 of the primary coil L1 is connected to the switching element 70. Further, the drive IC 71 controls switching of the switching element 70 in accordance with an EST signal received from the ECU 105. To cause the ignition device 1 to operate, first, the signal level of an EST signal transmitted from the ECU 105 to the drive IC 71 is changed from L to H at a time to, as shown in FIG. 3. Then, the drive IC 71 changes the state of the switching element 70 from an open state to a closed state in accordance with the EST signal. This causes a primary current to flow through the primary conductor 81 forming the primary coil L1, to charge the primary coil L1 with electric charge. Hereinafter, such a process in which a primary current flows through the primary coil L1 to charge the primary coil L1 will be referred to as "charge control". Further, an energization magnetic flux is formed in the primary coil L1, and a magnetic field corresponding to the energization magnetic flux acts on the iron core 60.

Moreover, a potential difference is caused between both ends 821 and 822 of the secondary coil L2 electromagnetically coupled to the primary coil L1 via the iron core 60 by the effect of mutual induction. That is, an ON-state voltage (960 V, for example) is generated across both ends 821 and 822 of the secondary coil L2. Thus, the maximum value of a voltage applied to the one end 822 of the secondary coil L2 is a positive value (about plus 480 V, for example), and the minimum value of a voltage applied to the other end 821 of the secondary coil L2 is a negative value (about minus 480 V, for example). In the present embodiment, the limiting diode 114 is interposed in the above-described first connecting wire 122. The limiting diode 114 is forward-biased when it is oriented in a direction from the one end 822 to the other end 821 of the secondary coil L2. Further, the breakdown voltage of the limiting diode 114 is 1 kV or higher and is higher than the maximum value of the ON-state voltage. Hence, a current can be prevented from flowing in the reverse direction of the limiting diode 114. Specifically, a current can be prevented from flowing toward the secondary coil L2 via the first connecting wire 122. Consequently, discharge can be prevented from occurring in the spark plug 113 in an ON state, that is, at an abnormal timing.

After the charge control, the signal level of the EST signal transmitted from the ECU 105 to the drive IC 71 is changed from H to L at a time t1. Then, the drive IC 71 changes the state of the switching element 70 from a closed state to an open state, to interrupt the primary current flowing from the power supply device 102 to the primary coil L1. As a result, induced electromotive force is induced in the secondary coil L2 electromagnetically coupled to the primary coil L1 via the iron core 60 by the effect of mutual induction. In the present embodiment, a high negative voltage is induced at the one end 822 of the secondary coil L2. At that time, a voltage value at the one end 822 of the secondary coil L2 ranges from minus several thousands of volts to several tens of thousands of volts with respect to the ground point (ground).

Further, an absolute value of the high negative voltage induced at the one end 822 of the secondary coil L2 exceeds the electric breakdown voltage at the gap d of the spark plug 113. This causes electric breakdown at the gap d of the spark plug 113. Then, there is generated a current that flows from the ground point (ground) to the center electrode 141 of the spark plug 113 via the ground electrode 142 of the spark plug 113 (refer to FIG. 1), further flows through the secondary coil L2, and becomes a forward current of the limiting diode 114. As a result, discharge occurs at the gap d of the spark plug 113, so that spark is generated and a fuel supplied to the internal combustion engine is ignited. Note that, in the present invention, such a process in which the state of the switching element 70 is changed to an open state, a primary current flowing through the primary coil L1 is interrupted, and a high voltage is induced at the one end 822 of the secondary coil L2, to cause discharge at the gap d of the spark plug 113 will be referred to as "discharge control". When an absolute value of the high negative voltage induced at the one end 822 of the secondary coil L2 falls below the electric breakdown voltage at the gap d of the spark plug 113 (at a time t2), the discharge at the gap d of the spark plug 113 ends once.

As described above, the floating capacitor Cs including an electrostatic capacitance component of about 15 to 20 picofarads is formed between the one end 822 of the secondary coil L2 and the spark plug 113. Thus, also when the discharge at the gap d of the spark plug 113 ends once (at the time t2), electric charge still remains near the center electrode 141 of the spark plug 113, in the second connecting wire 121, near the one end 822 of the secondary coil L2, or the like, in some cases. In the present embodiment, negative electric charge remains in those spots. Thus, at the time t2, a voltage value at the one end 822 of the secondary coil L2 is a negative value (minus 3 kV, for example) with respect to the ground point (ground). Hereinafter, the voltage value at the one end 822 of the secondary coil L2 at the time t2 will be referred to as a remaining voltage value Rv. The absolute value of the remaining voltage value Rv is lower than the electric breakdown voltage at the gap d of the spark plug 113. However, to leave the above-mentioned situation as it is would possibly cause discharge again at the gap d of the spark plug 113 at an unexpected timing such as a timing of a change in a pressure in the internal combustion engine afterwards.

In view of this, according to the present invention, a diode having a breakdown voltage lower than the absolute values of the electric breakdown voltage at the gap d of the spark plug 113 and the remaining voltage value Rv is used as the limiting diode 114. The limiting diode 114 used in the present embodiment has a breakdown voltage of 2 kV or less. In the above-described example, the remaining voltage value Rv at the one end 822 of the secondary coil L2 (on the anode side of the limiting diode 114) is a negative value (minus 3 kV, for example). Meanwhile, a voltage applied to the power supply line 150 (on the cathode side of the limiting diode 114) is plus 12 V and thus is at a potential much higher than the remaining voltage value Rv. Thus, a current flows from the side closer to the power supply device 102 in the reverse direction of the limiting diode 114 for a short period of time (between the time t2 and a time t3). In other words, a current flows toward the vicinity of the one end 822 of the secondary coil L2 via the first connecting wire 122.

As a result, the electric charge remaining near the center electrode 141 of the spark plug 113, in the second connecting wire 121, near the one end 822 of the secondary coil L2, or the like, can be eliminated. Then, the absolute value of the voltage (secondary voltage) generated at the one end 822 of the secondary coil L2 can be reduced, so that residual energy remaining in those spots can be reduced. Consequently, discharge can be prevented from occurring again at the gap d of the spark plug 113 at an unexpected timing even when a pressure in the internal combustion engine is changed afterwards. Further, this phenomenon continues until a potential difference between the voltage (secondary voltage) generated at the one end 822 of the secondary coil L2 on the anode side of the limiting diode 114 and the voltage applied to the power supply line 150 on the cathode side of the limiting diode 114 becomes equal to the breakdown voltage of the limiting diode 114. The absolute value of the voltage (secondary voltage) generated at the one end 822 of the secondary coil L2 is much higher than the absolute value of the voltage applied to the power supply line 150. For this reason, it can be considered that this phenomenon continues until the absolute value of the secondary voltage (denoted by "Vz" in FIG. 3) becomes substantially equal to the breakdown voltage of the limiting diode 114. Additionally, the absolute value of the voltage (secondary voltage) at the one end 822 of the secondary coil L2 is thereafter further reduced by flow of an ion current through the gap d between the center electrode 141 and the ground electrode 142 of the spark plug 113 and flow of a leakage current through the limiting diode 114 (between the time t3 and a time t4).

Further, the breakdown voltage of the limiting diode 114 is lower than the electrical breakdown voltage at the gap d of the spark plug 113 as described above. This allows a current to flow from the side closer to the power supply device 102 toward the vicinity of the one end 822 of the secondary coil L2 via the first connecting wire 122 in the reverse direction of the limiting diode 114. Consequently, the residual energy can be reduced, so that discharge can be prevented from occurring again at the gap d of the spark plug 113 after the time 2, that is, at an abnormal timing.

As described above, in the present invention, a current is prevented from flowing toward the secondary coil L2 in the reverse direction of the limiting diode 114 when a primary current flows through the primary coil L1 (ON state). Thus, discharge can be prevented from occurring in the spark plug 113 in an ON state, that is, at an abnormal timing. Meanwhile, after the discharge, a current flows toward the vicinity of the one end 822 of the secondary coil L2 in the reverse direction of the limiting diode 114, so that residual energy remaining near the center electrode 141 of the spark plug 113, in the second connecting wire 121, near the one end 822 of the secondary coil L2, or the like can be reduced. As a result, discharge can be prevented from occurring again at the gap d of the spark plug 113 after the discharge, that is, at an abnormal timing. Consequently, also in an internal combustion engine using a fuel including hydrogen that has properties of high combustibility at relatively low temperatures and of a high combustion rate, the fuel can be prevented from being ignited at an abnormal timing, leading to prevention of breakage of an engine and the like.

Further, the present embodiment can provide a configuration that overcomes the problem of the present invention by interposing the limiting diode 114 in the first connecting wire 122 of the ignition coil 103. Meanwhile, in a conventional ignition coil, another element different from a Zener diode and an avalanche diode is placed in a position corresponding to the first connecting wire in some cases. Thus, in the present embodiment, it is only required to replace the different element in the conventional ignition coil with the limiting diode 114. This improves operability in manufacturing the ignition device 1 of the present embodiment, to thereby reduce a manufacturing cost.

2. Modifications

The illustrative preferred embodiment of the present invention has been described above, but the present invention is not limited to the above-described preferred embodiment.

Figure 4:
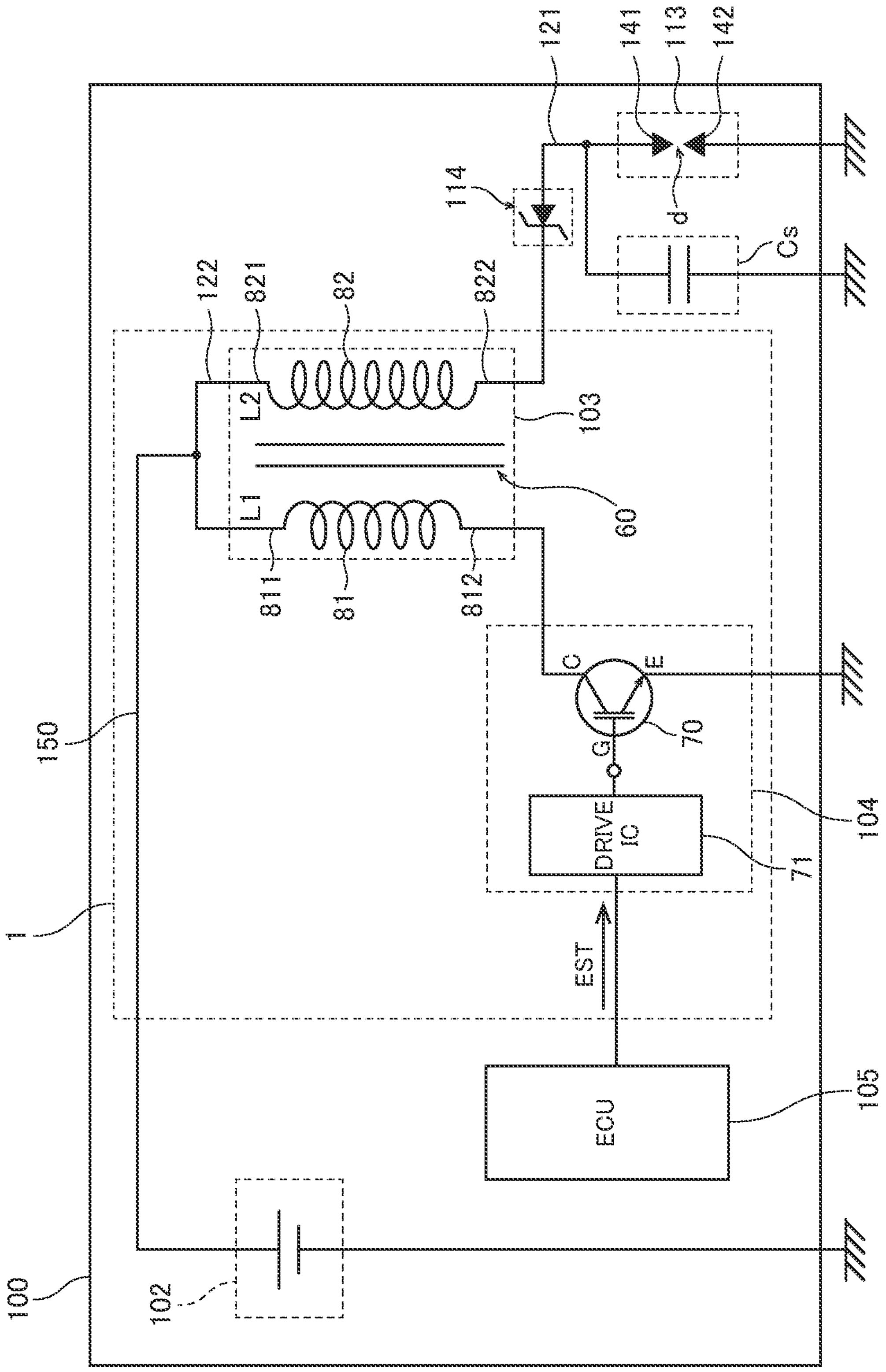
FIG. 4 is a block diagram schematically showing an operating environment of an ignition device for use in an internal combustion engine according to a first modification.

FIG. 4 is a block diagram schematically showing an operating environment of the ignition device 1 according to a first modification. In the above-described preferred embodiment, the limiting diode 114 is interposed in the first connecting wire 122 connecting the other end 821 of the secondary coil L2 and the power supply line 150. However, as shown in the first modification in FIG. 4, the limiting diode 114 may be interposed in the second connecting wire 121 connecting the one end 822 of the secondary coil L2 and the spark plug 113. Also in this modification, the limiting diode 114 is forward-biased when it is oriented in a direction from the one end 822 to the other end 821 of the secondary coil L2. Further, for the limiting diode 114 of the present modification, the limiting diode 114 having a specification similar to that in the above-described preferred embodiment is used. Moreover, the configurations of the respective parts of the ignition device 1 of the present modification except the limiting diode 114 are the same with the configurations of the respective parts of the ignition device 1 of the above-described preferred embodiment except the limiting diode 114.

Also in the present modification, first, charge control is performed in which a primary current flows through the primary coil L1 to charge the primary coil L1 (ON state), and thus a potential difference is caused between both ends 821 and 822 of the secondary coil L2 by the effect of mutual induction. Specifically, in an ON state, an ON-state voltage (960 V, for example) is generated across the ends 821 and 822 of the secondary coil L2. Further, the maximum value of a voltage applied to the one end 822 of the secondary coil L2 is a positive value (about plus 480 V, for example), and the minimum value of a voltage applied to the other end 821 of the secondary coil L2 is a negative value (about minus 480 V, for example). In the present modification, the limiting diode 114 is interposed in the above-described second connecting wire 121. The limiting diode 114 is forward-biased when it is oriented in a direction from the one end 822 to the other end 821 of the secondary coil L2. Thus, a current can be prevented from flowing from the side closer to the power supply device 102 in the reverse direction of the limiting diode 114. Specifically, a current can be prevented from flowing to the secondary coil L2 and the spark plug 113 via the first connecting wire 122. Consequently, discharge can be prevented from occurring in the spark plug 113 in an ON state, that is, at an abnormal timing.

Further, after the discharge, a current flows from the side closer to the power supply device 102 to the secondary coil L2 and the spark plug 113 via the first connecting wire 122, so that residual energy remaining near the center electrode 141 of the spark plug 113, in the second connecting wire 121, near the one end 822 of the secondary coil L2, or the like can be reduced. In other words, because of flow of a current in the reverse direction of the limiting diode 114, residual energy remaining near the center electrode 141 of the spark plug 113, in the second connecting wire 121, near the one end 822 of the secondary coil L2, or the like can be reduced. As a result, discharge can be prevented from occurring again at the gap d of the spark plug 113 after the discharge, that is, at an abnormal timing.

In the above-described preferred embodiment and the first modification, there is formed a configuration in which a voltage applied to the one end 822 of the secondary coil L2 is a positive value and a voltage applied to the other end 821 of the secondary coil L2 is a negative value in charge control. Further, in the configuration, a high negative voltage ranging from minus several thousands of volts to minus several tens of thousands of volts is induced at the one end 822 of the secondary coil L2 in discharge control. However, the positive and negative of each value of voltages applied to the ends 821 and 822 of the secondary coil L2 may be reversed by a change of the winding direction of the primary conductor 81 in the primary coil L1 and the winding direction of the secondary conductor 82 in the secondary coil L2. In this case, it is only required to interchange the forward direction and the reverse direction of the limiting diode 114 interposed in the first connecting wire 122 or the second connecting wire 121.

In the above-described preferred embodiment and the first modification, the cathode side of the limiting diode 114 and the other end 821 of the secondary coil L2 are connected to the plus side of the power supply device 102. However, as shown in a second modification in FIG. 5 and a third modification in FIG. 6, the cathode side of the limiting diode 114 and the other end 821 of the secondary coil L2 may be connected to the ground point (ground). Specifically, the limiting diode 114 may include a Zener diode or an avalanche diode that is interposed in the first connecting wire 122 connecting directly or indirectly the other end 821 of the secondary coil L2 and the ground point (ground) and is forward-biased when it is oriented in a direction from the one end 822 to the other end 821 of the secondary coil L2.

Figure 5:
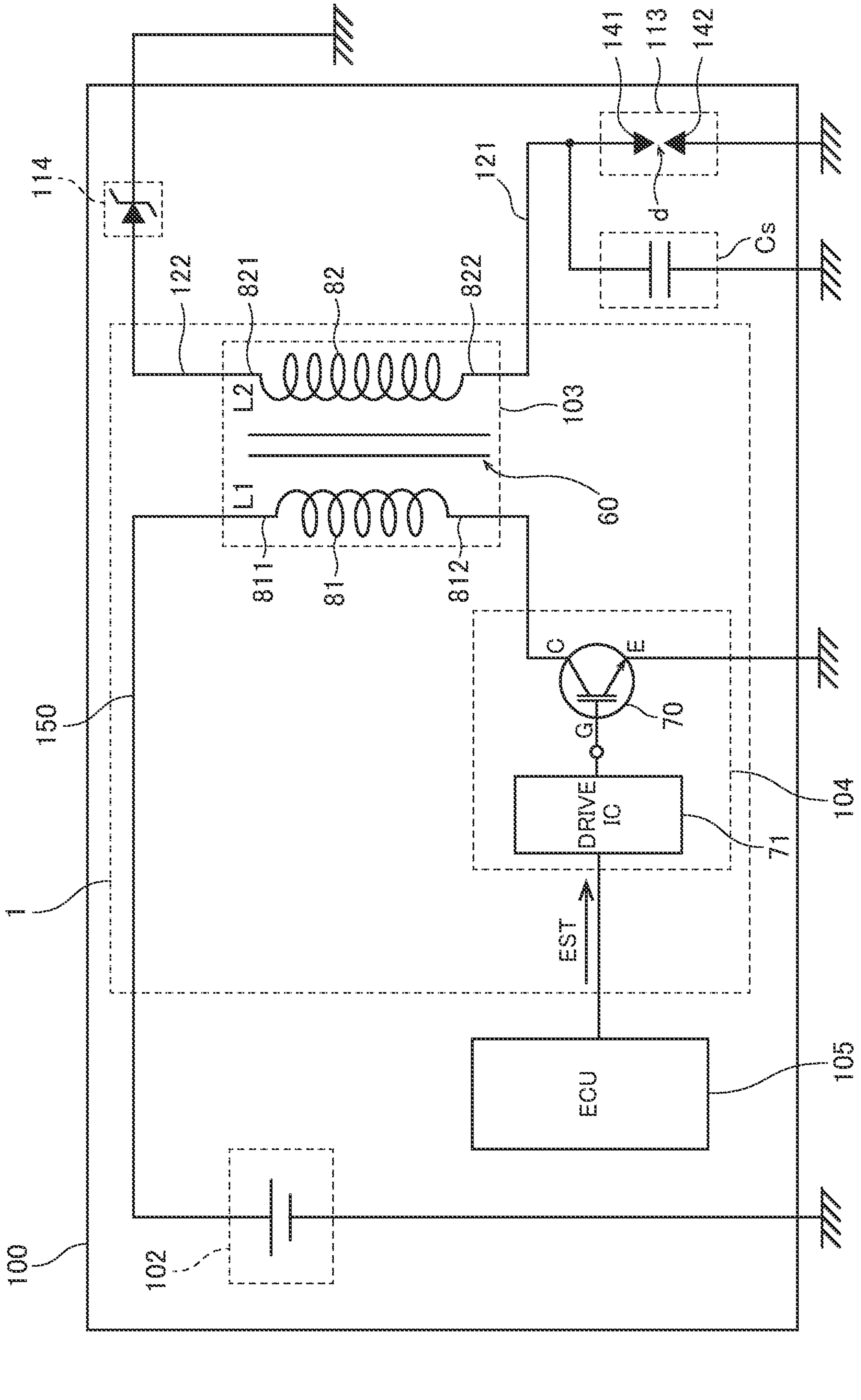
FIG. 5 is a block diagram schematically showing an operating environment of an ignition device for use in an internal combustion engine according to a second modification.
Figure 6:
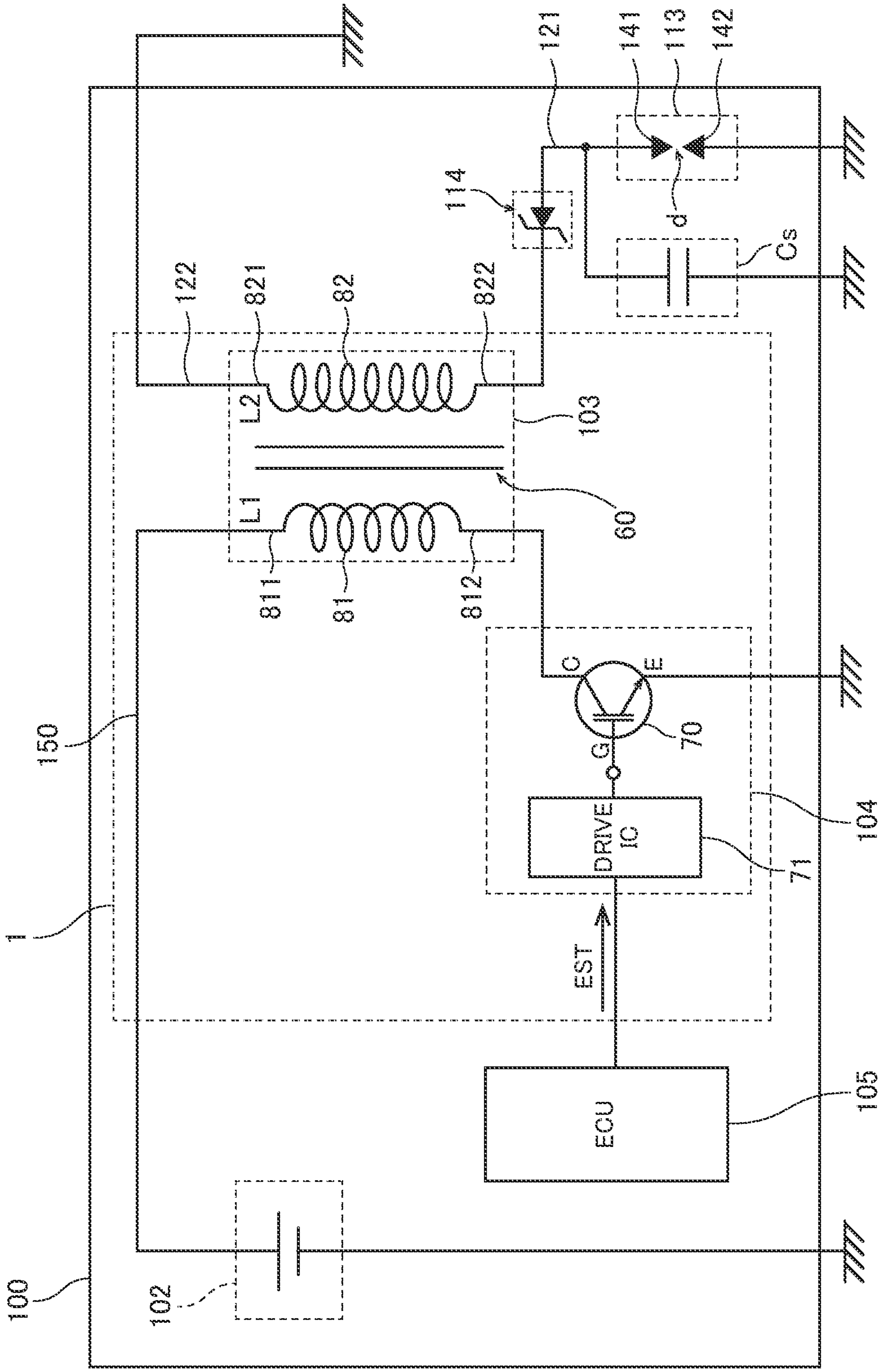
FIG. 6 is a block diagram schematically showing an operating environment of an ignition device for use in an internal combustion engine according to a third modification.

As shown in FIGS. 5 and 6, in the second modification and the third modification, first, charge control is performed in which a primary current flows through the primary coil L1 to charge the primary coil L1 (ON state), and thus a potential difference is caused between both ends 821 and 822 of the secondary coil L2 by the effect of mutual induction. Specifically, in an ON state, an ON-state voltage (960 V, for example) is generated across the ends 821 and 822 of the secondary coil L2. Further, the maximum value of a voltage applied to the one end 822 of the secondary coil L2 is a positive value (about plus 480 V, for example), and the minimum value of a voltage applied to the other end 821 of the secondary coil L2 is a negative value (about minus 480 V, for example). In the second modification, the limiting diode 114 is interposed in the first connecting wire 122. Meanwhile, in the third modification, the limiting diode 114 is interposed in the second connecting wire 121. The limiting diode 114 is forward-biased when it is oriented in a direction from the one end 822 to the other end 821 of the secondary coil L2. Thus, a current flows from the one end 822 to the other end 821 of the secondary coil L2 and further flows to the ground point (ground), so that an ON-state voltage is reduced. Consequently, discharge can be prevented from occurring in the spark plug 113 in an ON state, that is, at an abnormal timing.

Further, after the discharge, a current flows from the side closer to the ground point (ground) to the vicinity of the one end 822 of the secondary coil L2 and the center electrode 141 of the spark plug 113 in the reverse direction of the limiting diode 114, so that residual energy remaining near the center electrode 141 of the spark plug 113, in the second connecting wire 121, near the one end 822 of the secondary coil L2, or the like can be reduced. Consequently, discharge can be prevented from occurring again at the gap d of the spark plug 113 after the discharge, that is, at an abnormal timing.

The ignition device according to the present invention can be applied to any device that is mounted in various apparatuses such as a power generator or industrial machines, in addition to a vehicle such as an automobile, and is used for igniting a fuel by generating electric spark in a spark plug of an internal combustion engine.

The details of the shapes and configurations of the above-described ignition devices may be appropriately changed within a scope not departing from the gist of the present invention. Further, the respective elements described in the above-described preferred embodiment and modifications may be appropriately combined unless contradiction arises.

What is claimed is:

1. An ignition device for use in an internal combustion engine that uses a fuel including at least hydrogen, comprising:

an ignition coil formed by electromagnetic coupling of a primary coil and a secondary coil;

a power supply device configured to apply a direct-current voltage to one end of the primary coil via a power supply line;

a switching element interposed between the other end of the primary coil and a ground point, the switching element being capable of performing switching between passage and interruption of a primary current flowing through the primary coil from the power supply device;

a spark plug configured to ignite the fuel by occurrence of discharge at a gap, based on a high voltage induced at one end of the secondary coil; and a limiting diode including a Zener diode or an avalanche diode that is interposed in a first connecting wire connecting directly or indirectly the other end of the secondary coil and the power supply device or the ground point, or a second connecting wire connecting the one end of the secondary coil and the spark plug, and is forward-biased when the diode is oriented in a direction from the one end of the secondary coil to the other end of the secondary coil, wherein a breakdown voltage of the limiting diode is higher than a maximum value of an ON-state voltage obtained by multiplication of a voltage value of the direct-current voltage applied to the one end of the primary coil by the power supply device, by a ratio of the number of turns of the secondary coil to the number of turns of the primary coil.

2. The ignition device according to claim 1, further comprising a control unit configured to control the switching of the switching element, wherein the control unit performs:

charge control in which the switching element is placed in a closed state, and a primary current flows through the primary coil to charge the primary coil; and discharge control in which, after the charge control, a state of the switching element is changed to an open state and a high voltage is induced at the one end of the secondary coil, to cause discharge at the gap of the spark plug.

3. The ignition device according to claim 1, wherein the breakdown voltage is 1 kV or higher.

4. The ignition device according to claim 1, wherein a floating capacitor is formed between the one end of the secondary coil and the spark plug.

5. The ignition device according to claim 1, wherein the breakdown voltage is lower than an electrical breakdown voltage at the gap of the spark plug.

6. The ignition device according to claim 5, wherein the breakdown voltage is 2 kV or less.

7. The ignition device according to claim 1, wherein the limiting diode is interposed in the first connecting wire.

8. The ignition device according to claim 1, wherein the limiting diode is interposed in the second connecting wire.

* * * * *